May 21, 1935. K. BRATRING 2,001,765
MANUFACTURE OF HOLLOW ARTICLES FROM PLASTIC MATERIALS
Filed Nov. 30, 1932 3 Sheets-Sheet 1
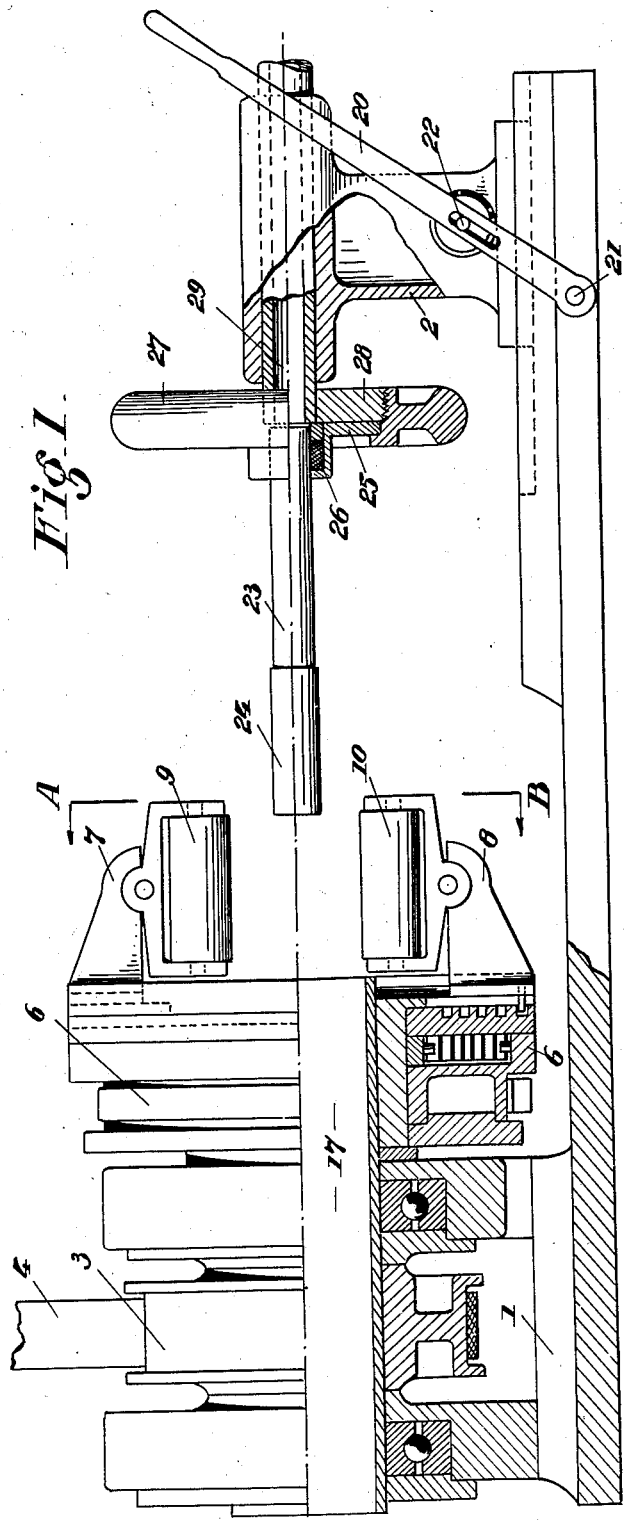

May 21, 1935. K. BRATRING 2,001,765
MANUFACTURE OF HOLLOW ARTICLES FROM PLASTIC MATERIALS
Filed Nov. 30, 1932 3 Sheets-Sheet 2
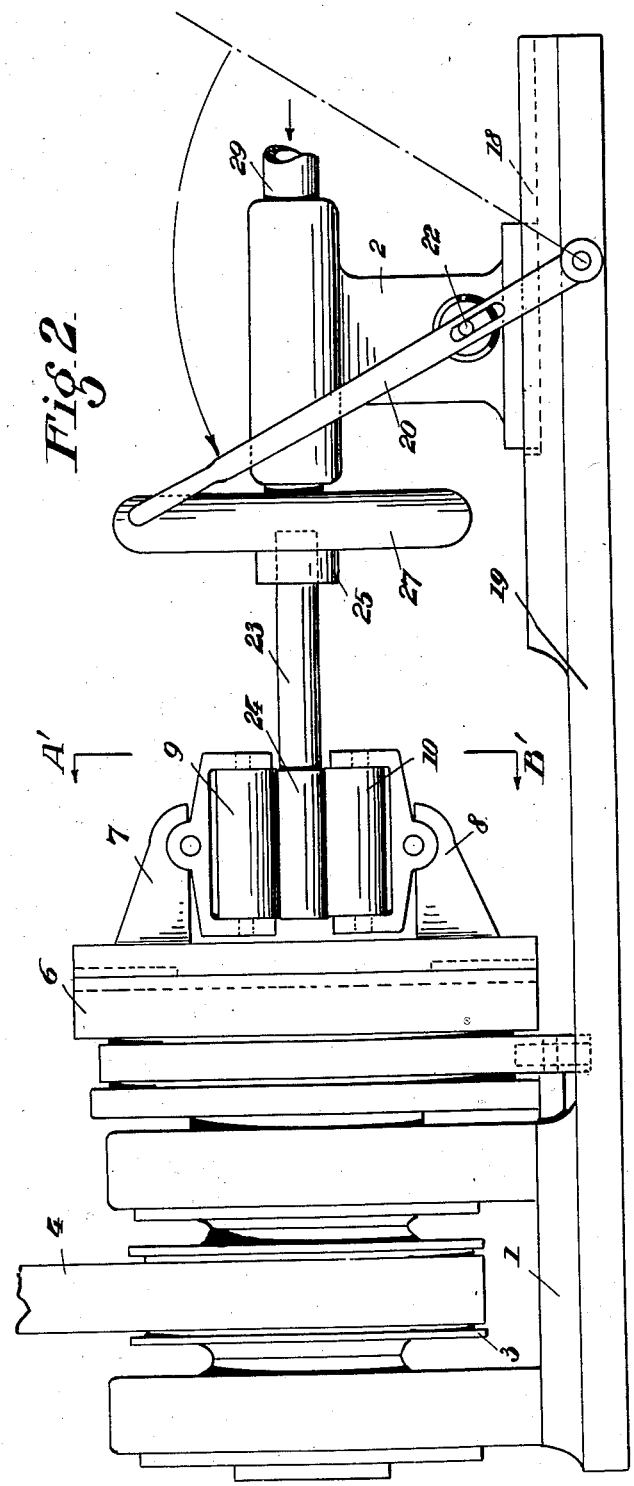

May 21, 1935. K. BRATRING 2,001,765
MANUFACTURE OF HOLLOW ARTICLES FROM PLASTIC MATERIALS
Filed Nov. 30, 1932 3 Sheets-Sheet 3
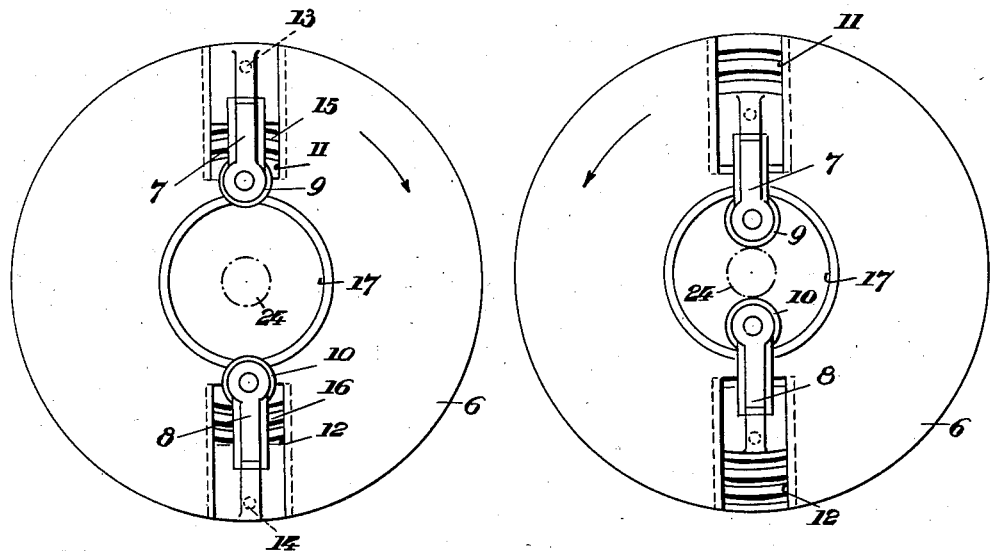
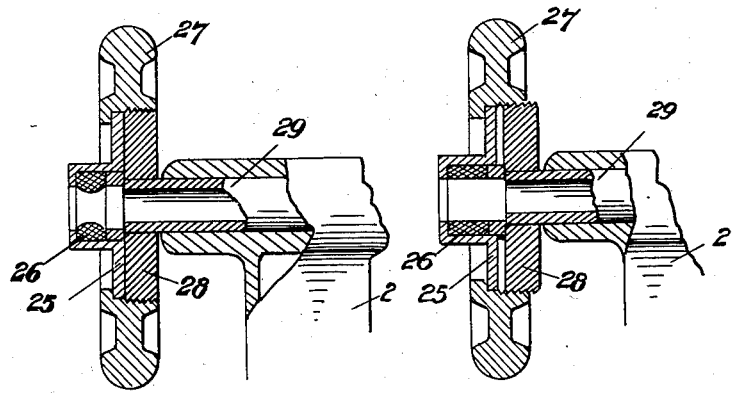
Inventor:
Kurt Bratring
By attorney Patented May 21, 1935

2,001,765

UNITED STATES PATENT OFFICE 2,001,765

MANUFACTURE OF HOLLOW ARTICLES FROM PLASTIC MATERIALS

Kurt Bratring, Berlin-Charlottenberg, Germany

Application November 30, 1932, Serial No. 644,942

10 Claims. (Cl. 18—2)

The present invention relates to a method and an apparatus for making hollow articles from plastic materials.

It has been found that hollow articles which are formed by dipping or by shrinkage on a rigid mould are more easily removed from the mould when they are previously loosened. According to the invention this previous loosening is effected in such a manner that the hollow article is knocked, pinched or rolled on to a solid elastic support. In the course of manufacture the preliminary loosening device is formed mechanically and the moulds with the hollow articles are supplied to it mechanically so that a high speed of production is obtained.

The method can be employed for hollow articles of various shapes. It is essentially suitable for hollow articles of cylindrical or conical shape. In this case, for example, the cylindrical or conical hollow bodies on correspondingly shaped moulds are laid between two cylindrical or conical rollers with rubber covering which fit tightly against the hollow mould and produce the preliminary loosening by their rotation.

In Figs. 1–6 of the accompanying drawings, devices are shown which are suitable for carrying out the method according to the present invention.

Fig. 1 shows the rolling off device 1 and the supply device 2 in plan in the above half and in section in the lower half.

Fig. 2 shows the same arrangement in plan. The supply device 2 is moved forward by turning the lever 20 to such an extent that the mould 23 for the hollow article with the hollow article on it is brought near to the rollers 9 and 10. These are brought sufficiently close together by movement of the coupling 6.

Fig. 3 is a section through Fig. 1 in the direction A—B, and Fig. 4 is a section through Fig. 2 in the direction A'—B'.

Fig. 5 shows in section the device for inserting in the mould in the same position as Fig. 1 and Fig. 6 shows the same when drawn together.

In Fig. 1, 3 is the driving pulley for the indirect rotation of the rollers 9 and 10, 4 is the belt. The rollers 9 and 10 are secured to the jaws 7 and 8 which can slide up and down in guides 11 and 12 (compare Figs. 3 and 4). On the jaws, pins 13 and 14 are provided which engage with the screw threads 15 and 16 of the coupling 6. If the coupling 6 is turned in one or other direction, the jaws 7 and 8 are displaced and therewith the rollers are moved towards the middle or vice versa. After the preliminary loosening, the hollow bodies are withdrawn from the mould in a suitable manner, for example by blowing off, and are removed from the device through the channel 17.

The supply device 2 is constructed as a slide which can slide in the bed 18 on the same machine frame 19 which carries the device 1. The slide is moved backwards or forwards by means of the lever 20 which rotates about the pivot 21 and is connected with the slide by the pin 22. The mould 23 on which is the hollow article 24 is inserted in a bushing consisting of the nut 25 and the rubber ring 26. The bushing is secured in the hand wheel 27 which engages with the flange 28 provided on the tube 29 of the slide 2. By turning the hand wheel, the bushing is brought nearer to the flange (compare Fig. 6) and the rubber is thereby compressed. When it is desired to remove the mould, which is not shown in Figs. 5 and 6, the wheel is turned back into the position shown in Fig. 5. When the mould is constructed as a blowing off mould, air can be supplied through the tube 29 even during the preliminary loosening and the hollow article is then removed from the device through the channel 17 by means of the compressed air.

What I claim is:

1. The method of molding which includes applying a plastic material to a mold for forming an article and permitting the same to solidify thereon, then subjecting the article thus formed to impact for loosening the same from the mold, and thereupon by a force exerted within the mold ejecting the thus formed article from the mold.

2. The method of molding which includes applying a plastic material to a mold for forming an article and permitting the same to solidify thereon, then subjecting the article thus formed to impact for loosening the same from the mold, and thereupon applying fluid under pressure for ejecting the thus formed article from the mold.

3. The method of molding which includes applying a plastic material to a mold for forming an article and permitting the same to solidify thereon, then subjecting the article thus formed to impact for loosening the same from the mold, and thereupon applying fluid under pressure directly to the mold for ejecting the thus formed article from the mold.

4. The method of molding which includes applying a plastic material to a mold for forming an article and permitting the same to solidify thereon, then subjecting the article thus formed to cushioned impact for loosening the same from the mold, and thereupon ejecting the thus formed article from the mold.

5. In an apparatus of the character described, in combination, a displaceable member for supporting a mold and a molded article carried thereby, a yielding and adjustable member for engagement with the molded article by impact for loosening the same on said mold, and means for extracting the article arranged adjacent to said yielding member.

6. In an apparatus of the character described, in combination, a reciprocable member for yieldingly supporting a mold and a molded article carried thereby, a revoluble member carried by a support in turn rotatable substantially axially of said mold, and means for bringing said revoluble member into pressure engagement with said molded article.

7. In an apparatus of the character described, in combination, a reciprocable member for yieldingly supporting a mold and a molded article carried thereby, a revoluble yielding member carried by a support in turn rotatable substantially axially of said mold, and means for bringing said revoluble member into pressure engagement with said molded article.

8. In an apparatus of the character described, in combination, a reciprocable member for yieldingly supporting a mold and a molded article carried thereby, a revoluble member having a yielding surface and carried by a support in turn rotatable substantially axially of said mold, and means for bringing said revoluble member into pressure engagement with said molded article.

9. In an apparatus of the character described, in combination, a reciprocable member for yieldingly supporting a mold and a molded article carried thereby, a revoluble member carried by a support in turn rotatable substantially axially of said mold, means for bringing said revoluble member into surface engagement with said molded article for loosening the same, and means for supplying fluid under pressure to said mold for ejecting the article therefrom.

10. In an apparatus of the character described, in combination, a displaceable member for yieldingly supporting a mold and a molded article carried thereby, a yielding and adjustable member for engagement with the molded article by impact for loosening the same on said mold, said mold having a passageway for fluid under pressure, and means for supplying fluid under pressure to said passageway for ejecting the article from the mold.

KURT BRATRING.